July 2, 1957     C. ANSCHUTZ     2,797,824
HOPPER BARGE
Filed April 15, 1953
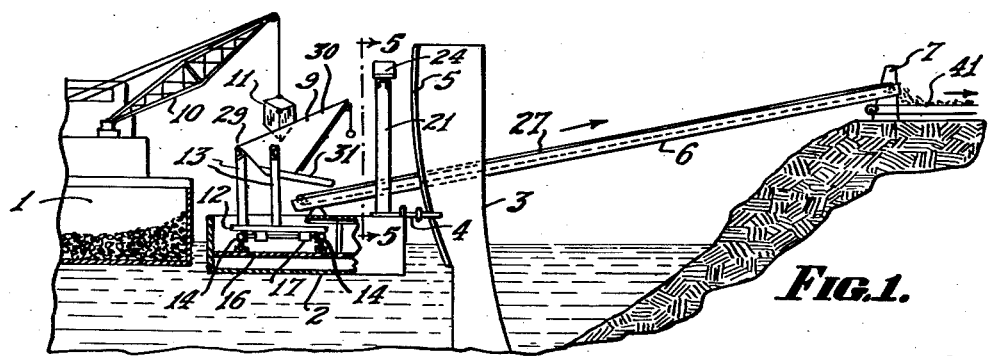
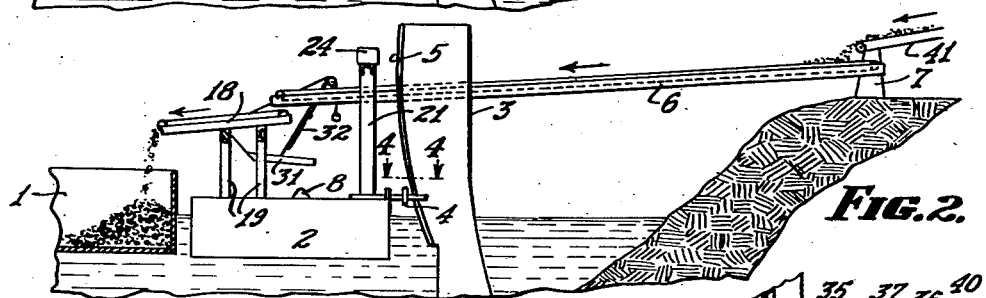
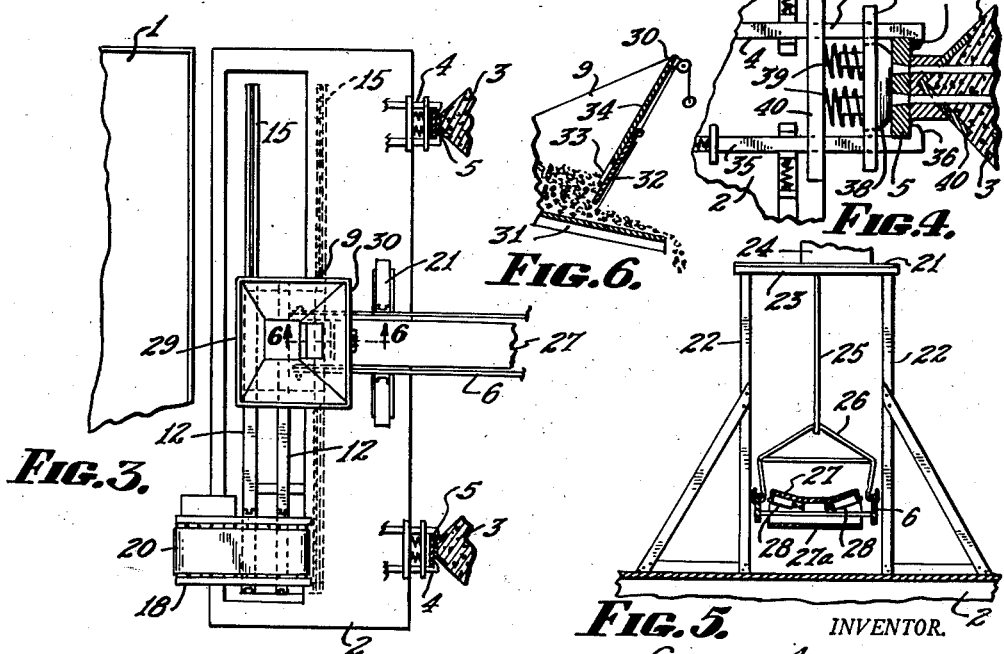
INVENTOR.
CHARLES ANSCHUTZ,
BY Allen & Allen
ATTORNEYS.

United States Patent Office 2,797,824
Patented July 2, 1957

2,797,824

HOPPER BARGE

Charles Anschutz, Dayton, Ky.

Application April 15, 1953, Serial No. 348,941

8 Claims. (Cl. 214—14)

My invention relates generally to equipment for loading and unloading river barges, and relates particularly to the provision of an improved hopper barge which constitutes a part of the permanent equipment at the unloading station.

In my recently issued Patent No. 2,628,727, entitled Barge Unloading Device, I have taught the provision of an unloading installation wherein a conveyor boom is pivoted at one end to a support on the shore and is supported at its other end on an unloading or hopper barge floating in the river or other body of water. The hopper barge is anchored to piers having vertically disposed guide members along which the hopper barge is adapted to move as the water level of the body of water in which the barge is floating rises or falls. The hopper barge is anchored to the guide members by means of clamping elements which slidably engage the guide bars; and hence movement of the barge relative to the guide members is automatic. The conveyor boom, being pivoted at its shore end, moves with the unloading barge and hence its position is also automatically adjusted with each change in the water level. By making the vertically disposed guide members of predetermined arcuate configuration, I found that the relative positions of the barge and the free end of the conveyor boom supported thereon could be maintained constant irrespective of changes in the elevation of the barge. Thus the unloading operation could be made continuous without the usual interruptions necessitated by changes in the water level which heretofore required adjustment of the mooring lines securing the hopper barge to the shore or other anchorage, as well as adjustment of the conveyor boom relative to the barge.

In an unloading operation such as the one just described, the coal or other material being unloaded from the river barges is lifted from the barge being unloaded by means of a crane and bucket which act to deposit the material in a large bin or hopper carried on the unloading barge above the end of the conveyor boom. The material is funneled from the hopper onto the endless belt conveyor carried by the boom, which transports the material to shore where it is stored or loaded directly into waiting coal cars or trucks.

The instant invention relates specifically to improvements in the device taught in my above mentioned patent, particularly in the provision of a hopper barge which may be readily converted for a loading operation as where it is desired to load material from shore onto a waiting barge, and just as quickly reconvert the hopper barge for an unloading operation.

It is a principal object of my invention to provide a hopper barge of the character described wherein the hopper is movable from an unloading position in which it overlies the end of the conveyor boom to a loading position in which the hopper is moved away from the conveyor boom and replaced by a conveyor extension adapted to receive material from the conveyor boom and convey it to a waiting barge.

It is a further object of my invention to provide a hopper and a conveyor extension mounted on a single carriage for joint movement therewith, the carriage being in turn mounted on the hopper barge and selectively movable from a position in which the hopper overlies the conveyor boom to a position in which the conveyor extension is in operative relation with the conveyor boom.

It is a further object of my invention to provide a hopper construction which will minimize the amount of lift necessary to deposit the material in the hopper. Ancillary to this objective it is a further object of my invention to provide a hopper of improved construction which facilitates the delivery of the material to the conveyor boom.

Yet another object of my invention is the provision of conveyor boom supporting means on the hopper barge for adjusting the position of the conveyor boom relative to the barge to accommodate changes from an unloading to a loading operation.

These and other objects of my invention which will appear hereinafter or which will be apparent to the skilled worker in the art upon reading these specifications, I accomplish by that construction and arrangement of parts of which I shall now describe an exemplary embodiment.

Reference is made to the accompanying drawings wherein:

Figure 1 is an elevational view with parts in section and other parts broken away showing the arrangement of parts for an unloading operation.

Figure 2 is an elevational view similar to Figure 1 showing the arrangement of parts for a loading operation.

Figure 3 is a partial plan view with parts broken away of the device in the position seen in Figure 1.

Figure 4 is a sectional view taken along the line 4—4 of Figure 2.

Figure 5 is a sectional view taken along the line 5—5 of Figure 1.

Figure 6 is a sectional view taken along the line 6—6 of Figure 3.

For an understanding of the general operation of my invention, reference is made to Figure 1 of the drawings, wherein reference numeral 1 indicates a loaded barge drawn beside the unloading or hopper barge 2 slidably anchored to pier 3 by means of clamping device 4 which slidably engages guide member 5 forming a part of the pier 3. A conveyor boom 6 extends between the hopper barge and shore, being pivotally supported at its shore end on support 7 and resting at its other end on boom rest 8. The hopper 9 is provided on the unloading barge and material is fed to the hopper from the loaded barge 1 by means of the crane 10 and bucket 11. The crane and bucket may be carried on a dock boat positioned adjacent the hopper barge in convenient position to lift material from the loaded barge and transfer it to the hopper; or, if desired, the crane may be mounted on the hopper barge itself.

As best seen in Figures 1 and 3, the hopper 9 is mounted on carriage 12 by means of upright supports 13. The carriage 12 includes flanged wheels or rollers 14 adapted to move along tracks 15 extending longitudinally of the hopper barge and supported on sub-deck 16. The carriage 12 may be driven along the track by any suitable means, such as a prime mover 17. Alternatively, the carriage may be moved by means of a winch or by hand.

As will be clear from Figure 3, the hopper is supported above one end of the carriage, which is elongated and carries at its opposite end an extension conveyor 18 supported on upright supports 19. The conveyor 18 will preferably include an endless belt 20 moved from any suitable source of power, which may be independent of the means powering the endless belt of the conveyor 6 or connected therewith for synchronous movement.

It will now be evident that by moving the carriage 12 along the tracks 15, the hopper 9 and the extension conveyor 18 may be selectively positioned in operative relation to the conveyor boom 6.

As already indicated, the conveyor boom is adapted to rest on boom rest 8 when in unloading position beneath the hopper. The conveyor boom will, however, be supported by means of a supporting structure 21 which, as best seen in Figure 5, includes vertical posts 22 and cross brace 23 on which is mounted lifting means 24 to which the conveyor boom is connected by means of cable 25. The lifting means will comprise a winding device which may be either power driven or hand operated and serving in either event to raise and lower the conveyor boom relative to the barge. In the embodiment illustrated, the cable 25 is connected to the conveyor boom by means of a yoke 26 pivoted to opposite sides of the conveyor; and the conveyor includes an endless belt having an upper flight 27 and a lower flight 27a, the upper flight being preferably curved from side-to-side in the manner illustrated by means of rollers 28.

As best seen in Figure 1, the hopper 9, while of funnel shape, is low on its front side, as at 29, and high in back, as at 30. Thus the hopper is made relatively low where the bucket passes over it when delivering material from the barge 1; and it is made relatively high in back so that the bucket can be opened to discharge its contents as soon as it has passed over the short side of the hopper. This construction permits the unloading operation to be speeded-up since the bucket need not be lifted as far as it would where a conventional hopper is used; and in addition, the material in the bucket can be discharged during the swinging movement of the bucket over the hopper without having to first steady the bucket.

I have also found it preferable to provide the hopper with a somewhat downwardly inclined vibrator 31 arranged to deliver the material from the hopper to the conveyor belt 27. The vibrator thus forms the bottom of the hopper and its vibration acts to maintain a steady flow of the material from the hopper to the conveyor. The rate of flow of material from the hopper may be adjusted by means of a door 32 covering opening 33 in the rear wall 34 of the hopper. The door 32 is slidably mounted and may be adjusted to expose any desired portion of the opening 33.

As best seen in Figure 4, the clamping devices 4 for securing the hopper barge to the guide members 5 extending along the edges of piers 3, comprises essentially clamping arms 35 having inturned projections 36 adapted to engage about the rear edges of the guide members. The clamping arms are maintained in clamping engagement with the guide member by means of a plate 37 having a projection 38 contacting the outer face of the guide member. The plate 37 is spring pressed into contact with the guide member by means of spring 39 fitted between the plate 37 and the abutment 40. For details in the construction of the clamping devices, reference is made to my copending application Serial No. 331,048 entitled Clamping Device, wherein the construction and operation of the clamping devices is fully set forth.

The piers disclosed herein differ, however, from those disclosed in the aforementioned copending application in that the instant piers have angularly related side edges 40, which when viewed in cross section, defines an angle the apex of which constitutes the leading edge of the pier and to which the guide member 5 is secured. The angle defined by the side edges 40 is preferably approximately 90° with the bisector of the angle lying normal to the adjacent side edge of the barge.

Piers constructed in this manner will prevent the accumulation of driftwood and the like between the hopper barge and the piers, which in the past has been a constant nuisance to the river man, and in addition the piers will provide a good ice harbor.

In the operation of my device for unloading purposes, the conveyor boom 6 is positioned with its free end resting on boom rest 8, whereupon the carriage 12 is moved to the position shown in Figures 1 and 3, wherein the hopper 9 overlies the free end of the conveyor boom. Material is then lifted from the barge 1 by means of the crane and bucket, the bucket being swung over the hopper and the material released as the bucket passes over the low or short side of the hopper. The conveyor belt 27 is moved in the direction of the arrow seen in Figure 1 to convey the material to shore, where it may be received by an additional conveyor 41 positioned beneath the pivoted end of conveyor boom 6. The additional conveyor will transport the material to a reloading station or to a stock pile. When it is desired to convert to a loading operation, the carriage is moved along the track 15 until the free end of the conveyor boom lies between the hopper 9 and the extension conveyor 18. The conveyor boom is then elevated to the position seen in Figure 2 by means of the lifting device 24. Upon elevation of the conveyor boom, the carriage is then moved to a position in which the conveyor boom overlies the extension conveyor. Preferably the extension conveyor will be adjustable longitudinally so that it may be extended outwardly over the barge 1 to the desired distance. For the loading operation, the additional conveyor 41 is positioned above the pivoted end of the conveyor boom 6, in the manner shown in Figure 2, and the conveyors are moved in the direction indicated by the arrows to transport the material from the shore to the waiting barge.

It will be evident that either the unloading or the loading operation is continuous and will be unaffected by rises or falls in the water level and the adjustment of the hopper barge and conveyor boom will be completely automatic. Modifications may be made in my invention without departing from the spirit of it. Having, however, described my invention in an exemplary embodiment, what I desire to secure and protect by Letters Patent is:

1. In a device for selectively transferring materials to and from a barge, a hopper barge, an adjustable boom conveyor extending between said hopper barge and a shore installation, a movable carriage on said hopper barge, a hopper and an extension conveyor mounted on said carriage, said carriage being movable on said barge from a first position in which said hopper is juxtaposed to said boom for transferring material from said hopper to said boom conveyor, to a second position in which said extension conveyor is juxtaposed to said boom conveyor for transferring material from said boom conveyor to said extension conveyor for transfer to a tow barge.

2. In a device for selectively transferring materials to and from a barge, a hopper barge, an adjustable boom conveyor extending between said hopper barge and a shore installation, tracks extending along said hopper barge, a carriage movable along said tracks, a hopper and an extension conveyor mounted on said carriage for movement therewith, and means for moving said carriage along said track whereby to selectively position said hopper and said extension conveyor in operative relation to said boom conveyor, and means on said hopper barge movably supporting the end of said boom conveyor for limited vertical movement relative to said hopper barge, whereby the end of the boom conveyor may be selectively positioned beneath the hopper for transferring material from the hopper to the boom conveyor, and above the extension conveyor for transferring material from the boom conveyor to the extension conveyor from which it is loaded on a tow barge.

3. The structure claimed in claim 2 wherein said boom conveyor is pivoted to a fixed support on its shore end, and wherein said hopper barge is connected to vertically extending guide members and is movable therealong with changes in the water level of the body of water in which the hopper barge floats, said boom conveyor being movable with said hopper barge.

4. The structure claimed in claim 3 wherein said hopper has a high rear side and a low front side, whereby material to be deposited in said hopper from a tow barge being unloaded may be swung over the low side of the hopper and dropped therein against the high side of the hopper.

5. The structure claimed in claim 4 wherein the high side of said hopper has an adjustable door therein for controlling the flow of the material from the hopper to said boom conveyor.

6. The structure claimed in claim 5 wherein the bottom of said hopper comprises a downwardly inclined vibrating member acting to agitate the material in the hopper and thereby cause it to flow through said door and onto said boom conveyor.

7. The structure claimed in claim 6 wherein said extension conveyor is movable axially so that it may be extended outwardly beyond an edge of said hopper barge when in use to load a tow barge and withdrawn within the confines of the hopper barge when not in use.

8. The structure claimed in claim 7 wherein said boom conveyor is supported from the deck of said hopper barge and is adapted to rest on a boom rest mounted on said deck when in position for receiving material from said hopper, said deck being cut away in part to expose a subdeck on which said tracks are mounted.

References Cited in the file of this patent

UNITED STATES PATENTS

| | | |
|---|---|---|
| 779,465 | Carr | Jan. 10, 1905 |
| 833,761 | Stevens | Oct. 23, 1906 |
| 1,496,570 | Watson | June 3, 1924 |
| 1,512,844 | Groshek | Oct. 21, 1924 |
| 2,200,550 | Helmers | May 14, 1940 |
| 2,322,504 | Brandon | June 22, 1943 |
| 2,605,912 | Small et al. | Aug. 5, 1952 |
| 2,628,727 | Anschutz | Feb. 17, 1953 |
| 2,697,442 | Anschutz | Dec. 21, 1954 |